United States Patent
Lin et al.

(10) Patent No.: US 8,154,530 B2
(45) Date of Patent: Apr. 10, 2012

(54) LIGHT TRANSMISSABLE TOUCH PANEL

(75) Inventors: Hsien Chang Lin, Hsinchu County (TW); Hsiang Jui Wang, Taoyuan County (TW)

(73) Assignee: RitFast Corporation, Hsinchu (TW)

( * ) Notice: Subject to any disclaimer, the term of this patent is extended or adjusted under 35 U.S.C. 154(b) by 348 days.

(21) Appl. No.: 12/545,449

(22) Filed: Aug. 21, 2009

(65) Prior Publication Data

US 2010/0321308 A1 Dec. 23, 2010

(30) Foreign Application Priority Data

Jun. 18, 2009 (TW) .............................. 98120367 A

(51) Int. Cl.
*G06F 3/041* (2006.01)
(52) U.S. Cl. ....................................................... 345/173
(58) Field of Classification Search .......... 345/173–174; 178/18.03–18.08
See application file for complete search history.

(56) References Cited

U.S. PATENT DOCUMENTS

| 2006/0066581 A1* | 3/2006 | Lyon et al. | 345/173 |
| 2007/0262962 A1* | 11/2007 | XiaoPing et al. | 345/173 |
| 2009/0085885 A1* | 4/2009 | Wu et al. | 345/173 |
| 2010/0045614 A1* | 2/2010 | Gray et al. | 345/173 |

* cited by examiner

*Primary Examiner* — Chanh Nguyen
*Assistant Examiner* — Jonathan Blancha
(74) *Attorney, Agent, or Firm* — WPAT, P.C.; Anthony King

(57) ABSTRACT

A touch panel includes a transparent substrate having a surface, a plurality of first touch sensor pads arrayed in a matrix on the surface, a plurality of second touch sensor pads arrayed in a matrix and staggered between the plurality of first touch sensor pads, a dielectric layer disposed upon the plurality of first touch sensor pads and the plurality of second touch sensor pads, a plurality of third touch sensor pads arrayed in a matrix on the dielectric layer, and a plurality of fourth touch sensor pads arrayed in a matrix on the dielectric layer and staggered between the plurality of third touch sensor pads. Each first touch sensor pad includes a first hollowed-out pattern, and each third touch sensor pad includes a second hollowed-out pattern and a solid portion formed around the second hollowed-out pattern, wherein a portion of the solid portion of each third touch sensor pad and a portion of the hollowed-out pattern of the first touch sensor pad overlap.

20 Claims, 8 Drawing Sheets

LIGHT TRANSMISSABLE TOUCH PANEL

BACKGROUND OF THE INVENTION

1. Field of the Invention

The present invention relates to a touch panel, and relates more particularly to a touch panel having touch sensor pads with hollowed-out patterns.

2. Description of the Related Art

Transparent touch panels can be placed upon display screens demonstrating operation contents for users to manipulate apparatuses providing the operation instructions using fingers or touch pens. Generally, touch panels can be categorized into eight types: a resistive type, a surface capacitive type, a projected capacitive type, a surface acoustic wave type, an optics imaging type, an infrared type, a bending wave type, and an active digitizer type. Due to the broad application areas, simplicity, and greater convenience for the use of mobile apparatuses, the transparent panels may become an important type of I/O interface.

Transparent touch panels include transparent conductive films, which generate signals when they are touched. According to the locations generating the signals, the operation option that a user desires can be determined. Because the transparent touch panels are placed in front of display screens, the contents displayed on the display screens need to be projected through the transparent touch panels for viewing. Such an arrangement may reduce the light emission from display screens due to the light transmissibility of the transparent touch panels, reducing display quality. For example, the light transmissibility of a surface capacitive touch panel is only 85%, and such a low light transmissibility may badly affect the brightness of display screens.

Moreover, touch electrode pads of a touch panel usually have straight edges, which may regularly reflect the light passing toward a certain direction through the touch electrode pads. As a result, the edges of the touch electrode pads may indistinctly appear on display screens so as to reduce the display quality.

Therefore, there is a need to improve traditional touch panels for increasing their light transmissibility and reducing their negative impact on display quality.

SUMMARY OF THE INVENTION

The present invention proposes a touch panel having touch sensor pads with hollowed-out patterns for increasing light permissibility. Stacked touch sensor pads have different hollowed-out patterns so that the edges of the hollowed-out patterns will not clearly show on display images or light reflection edges will not appear on display screens.

One embodiment of the present invention discloses a touch panel, which comprises a transparent substrate, a plurality of first touch sensor pads, a plurality of second touch sensor pads, a dielectric layer, a plurality of third touch sensor pads, and a plurality of fourth touch sensor pads. The transparent substrate includes a surface, wherein the surface is parallel to a plane formed by a first direction and a second direction. The plurality of first touch sensor pads are arranged in a matrix on the surface of the transparent substrate. The first touch sensor pads along the first direction are connected in series, wherein each first touch sensor pad includes a first hollowed-out pattern. The plurality of second touch sensor pads are arranged in a matrix on the surface and are staggered between the plurality of first touch sensor pads. The dielectric layer is disposed on the plurality of first and second touch sensor pads. The plurality of third touch sensor pads are arranged in a matrix on the dielectric layer, wherein each third touch sensor pad includes a second hollowed-out pattern and a solid portion defining the second hollowed-out pattern, and a portion of the solid portion of each third touch sensor pad overlaps a portion of the first hollowed-out pattern of the respective first touch sensor. The plurality of fourth touch sensor pads are arranged in a matrix on the dielectric layer and staggered between the plurality of third touch sensor pads, and all of the fourth touch sensor pads along the second direction are connected.

Another embodiment of the present invention discloses a touch panel, which comprises a transparent substrate, a plurality of first touch sensor pads, a plurality of second touch sensor pads, a plurality of third touch sensor pads, and a plurality of fourth touch sensor pads. The transparent substrate includes a first surface and a second surface, wherein the first surface and the second surface are parallel to a plane formed by a first direction and a second direction. The plurality of first touch sensor pads are arranged in a matrix on the first surface of the transparent substrate, wherein the first touch sensor pads along the first direction are connected in series and each first touch sensor pad includes a first hollowed-out pattern. The plurality of second touch sensor pads are arranged in a matrix on the first surface and are staggered with the plurality of first touch sensor pads. The plurality of third touch sensor pads are arranged in a matrix on the second surface, wherein each third touch sensor pad includes a second hollowed-out pattern and a solid portion defining the second hollowed-out pattern, and a portion of the solid portion of each third touch sensor pad overlaps a portion of the first hollowed-out pattern of the respective first touch sensor. The plurality of fourth touch sensor pads are arranged in a matrix on the second surface and staggered with the plurality of third touch sensor pads, and all of the fourth touch sensor pads along the second direction are connected.

To better understand the above-described objectives, characteristics and advantages of the present invention, embodiments, with reference to the drawings, are provided for detailed explanations.

BRIEF DESCRIPTION OF THE DRAWINGS

The invention will be described according to the appended drawings in which.

DETAILED DESCRIPTION OF THE INVENTION

Figure 1:
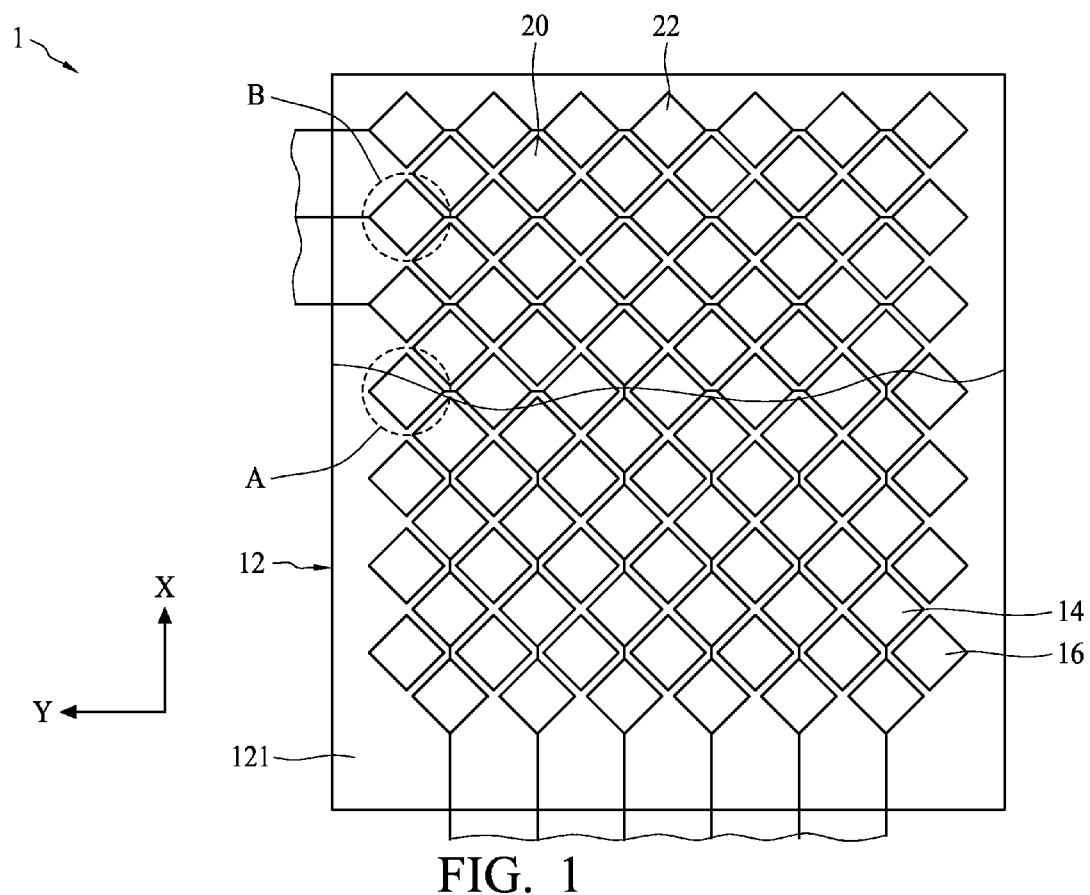
FIG. 1 shows a touch panel according to one embodiment of the present invention.
Figure 2:
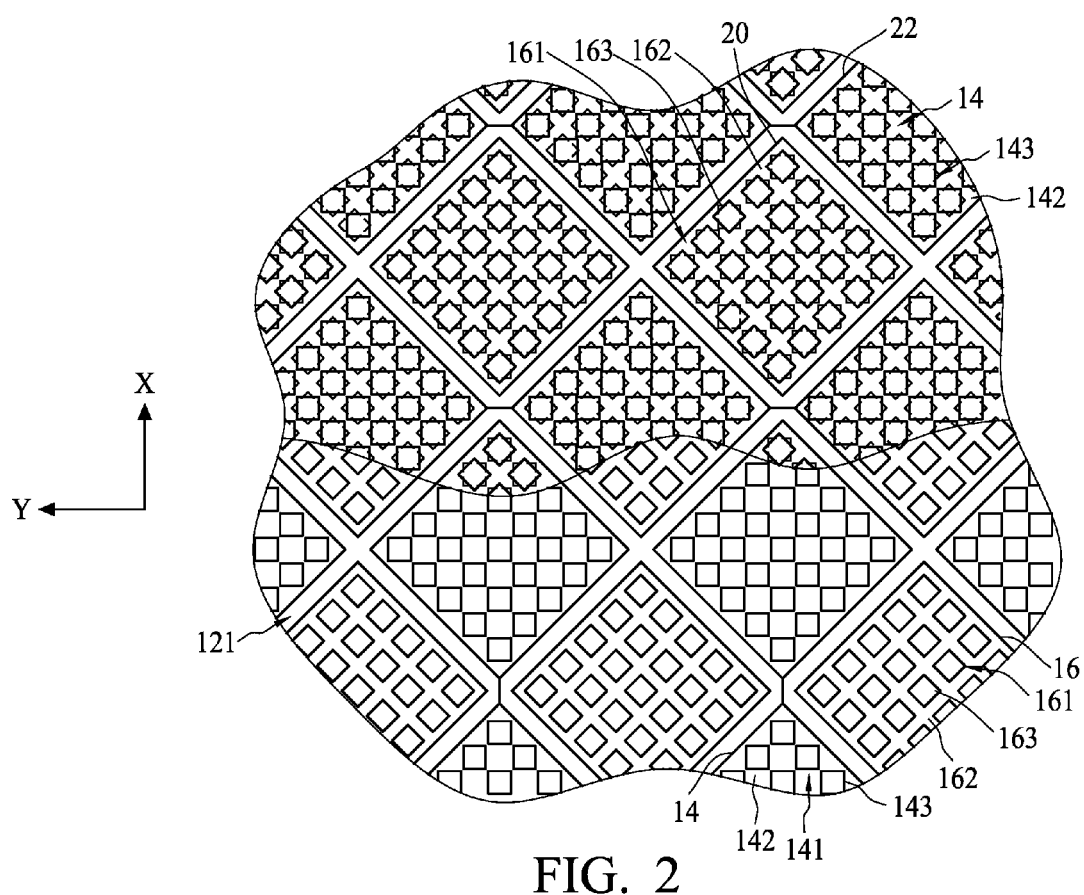
FIG. 2 is a fragmentary and enlarged view of the touch panel of FIG. 1.
Figure 3:
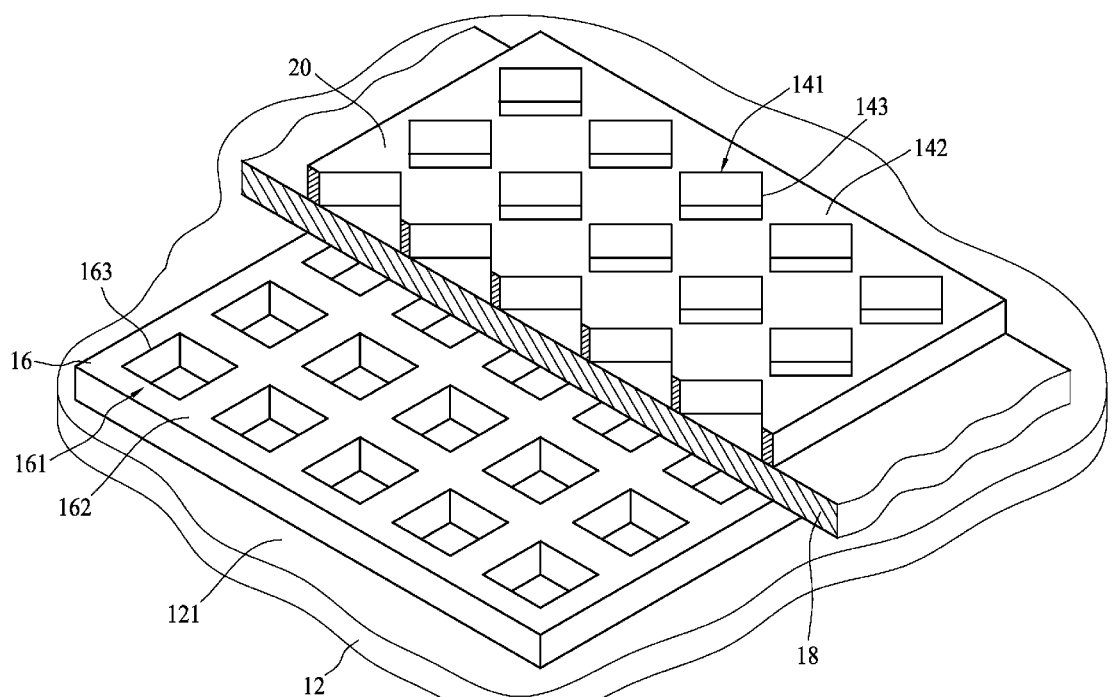
FIG. 3 is an enlarged perspective view showing a circular region A enclosed within the dashed line in FIG. 1.

FIG. 1 shows a touch panel 1 according to one embodiment of the present invention, FIG. 2 is a fragmentary and enlarged view of the touch panel 1 of FIG. 1, and FIG. 3 is an enlarged perspective view showing a circular region A enclosed within the dashed line in FIG. 1. Referring to FIGS. 1 to 3, the touch panel 1 of one embodiment of the present invention comprises a transparent substrate 12, a plurality of first touch sensor pads 14, a plurality of second touch sensor pads 16, a dielectric layer 18, a plurality of third touch sensor pads 20, and a plurality of fourth touch sensor pads 22. The transparent substrate 12 includes a surface 121 parallel to a plane defined by X- and Y-axes. The material of the transparent substrate 12 can be glass, polycarbonate, polymethyl methacrylate, or other materials that are considered suitable for the application of the touch panel 1 by persons skilled in the art.

The plurality of first touch sensor pads 14 are closely arranged in a matrix on the surface 121 of the transparent substrate 12. In each row along the X-axis direction, the array of first touch sensor pads 14 is serially connected as shown in FIG. 1 such that all of the first touch sensor pads 14 in one row are electrically connected. Each row of electrically connected first touch sensor pads 14 can be electrically connected to a controller (not shown), which is used to detect the locations of touch in each row of the first touch sensor pads 14. As shown in FIG. 2, each first touch sensor pad 14 includes a first hollowed-out pattern 141, which is defined by a first solid portion 142. The provision of the first hollowed-out pattern 141 to the first touch sensor pad 14 can increase the light transmissibility of the first touch sensor pad 14 and minimize the impact on the display quality of a display screen displaced beneath the touch panel 1. In the present embodiment, the first touch sensor pad 14 is a convex quadrilateral, with its 4 corners separately positioned in the directions along the X- and Y-axes. Each row of the first touch sensor pads 14 is serially connected by connecting two adjacent corners of the first touch sensor pads 14. In another embodiment, the first touch sensor pad 14 may be of a rhombus shape, a square shape, or other four-sided polygon shape.

The plurality of the second touch sensor pads 16 are also arranged in a matrix on the surface 121 of the transparent substrate 12. Among the closely arrayed first touch sensor pads 14 with convex quadrilateral shape, a roughly quadrilateral space is formed between four adjacent and surrounding first touch sensor pads 14, and each of the second touch sensor pads 16 is inserted onto the respective roughly quadrilateral space such that the surface 121 of the transparent substrate 12 is very densely and interspersedly arrayed with the first touch sensor pads 14 and the second touch sensor pads 16. The plurality of second touch sensor pads 16 can be dummy pads, which have no connection between any two of them. Each second touch sensor pad 16 may include a second hollowed-out pattern 161, which is defined by a second solid portion 162. The provision of the second hollowed-out pattern 161 to the second touch sensor pad 16 can increase the light transmissibility of the second touch sensor pad 16 and minimize the negative impact on the display quality of a display screen displaced beneath the touch panel 1. The second touch sensor pad 16 can be substantially similar to the first touch sensor pad 14, having a shape such as a rhombus shape, a square shape, or other four-sided polygon shape.

Referring to FIG. 3, upon the first touch sensor pads 14 and the second touch sensor pads 16, a dielectric layer 18 can be disposed for electrical insulation. The material of the dielectric layer 18 can be a transparent material, such as silicon oxide, silicon nitride, titanium oxide, zinc oxide, aluminum oxide, or other transparent dielectric material suitable in the art.

Referring to FIG. 2 again, a plurality of third touch sensor pads 20 are arranged in a matrix on the dielectric layer 18 as shown in FIG. 3, displaced correspondingly above the plurality of first touch sensor pads 14. The plurality of third touch sensor pads 20 having no connection therebetween are provided for balancing the influence of light absorption of the first touch sensor pads 14 to the display images of a display screen. Each third touch sensor pad 20 may include the above-mentioned second hollowed-out pattern 161, which is defined by a second solid portion 162.

On the dielectric layer 18, a plurality of fourth touch sensor pads 22 are further arranged in a matrix and are intermixed with the plurality of third touch sensor pads 20. Each fourth touch sensor pad 22 is above the respective second touch sensor pad 16. Among the plurality of fourth touch sensor pads 22, the fourth touch sensor pads 22 along the Y-axis direction are serially connected as shown in FIG. 2 such that each column of fourth touch sensor pads 22 is electrically connected. Each column of electrically connected first touch sensor pads 14 can be electrically connected to a controller (not shown), which is used to detect the locations of touch in each column of the fourth touch sensor pads 22. In the present embodiment, each fourth touch sensor pad 22 can include the above-mentioned first hollowed-out pattern 141.

In the present embodiment, the first hollowed-out pattern 141 can have a shape different from that of the second hollowed-out pattern 161 such that a portion of the first hollowed-out pattern 141 on each first touch sensor pad 14 can overlap a portion of the second solid portion 162 on each third touch sensor pad 20, and a portion of the second hollowed-out pattern 161 on each second touch sensor pad 16 can overlap a portion of the first solid portion 142 on each fourth touch sensor pad 22. Such overlap arrangements can ensure that the edges defining the first hollowed-out pattern 141 are not vertically aligned but are overlapped with the edges defining the second hollowed-out pattern 161. Overlapped edges may diffuse passing light so that edge images of the first hollowed-out pattern 141 and the second hollowed-out pattern 161 are blurred and do not clearly appear on display screens.

Figure 4:
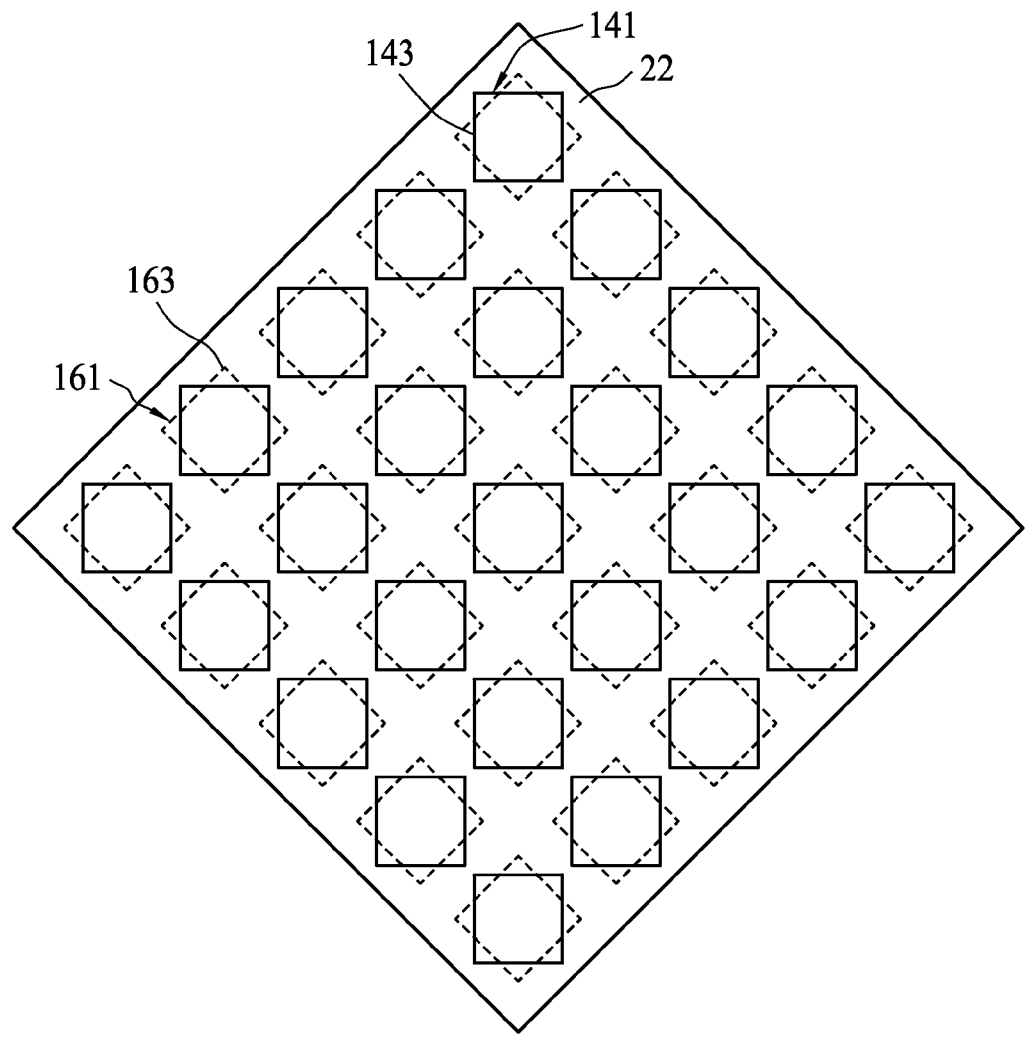
FIG. 4 is an enlarged view showing a circular region B enclosed within the dashed line in FIG. 1.

Referring to FIGS. 3 and 4, in the present embodiment, the first hollowed-out pattern 141 comprises a plurality of substantially similarly sized and regularly arrayed through holes 143 having a cross-sectional shape. The second hollowed-out pattern 161 also comprises a plurality of through holes 163 similar to the through holes 143 of the first hollowed-out pattern 141, wherein each through hole 163 is obtained by rotating the through hole 143 by some angle. The cross-sectional shapes of the through holes 143 and 163 include a polygonal shape, a circular shape, and an elliptical shape. In the present embodiment, the cross-sectional shape is a convex quadrilateral. The rotation angle is 45 degrees. One of the through holes 143 and 163, which may be originally aligned, is rotated such that the vertically aligned edges may be crossly and staggeringly overlapped. Such an angular rotation causes the originally aligned edges of the through holes (143 and 163), which reduce display image quality, to crossly overlap and blur the image of the edges so as to maintain a good level of image quality.

Figure 5:
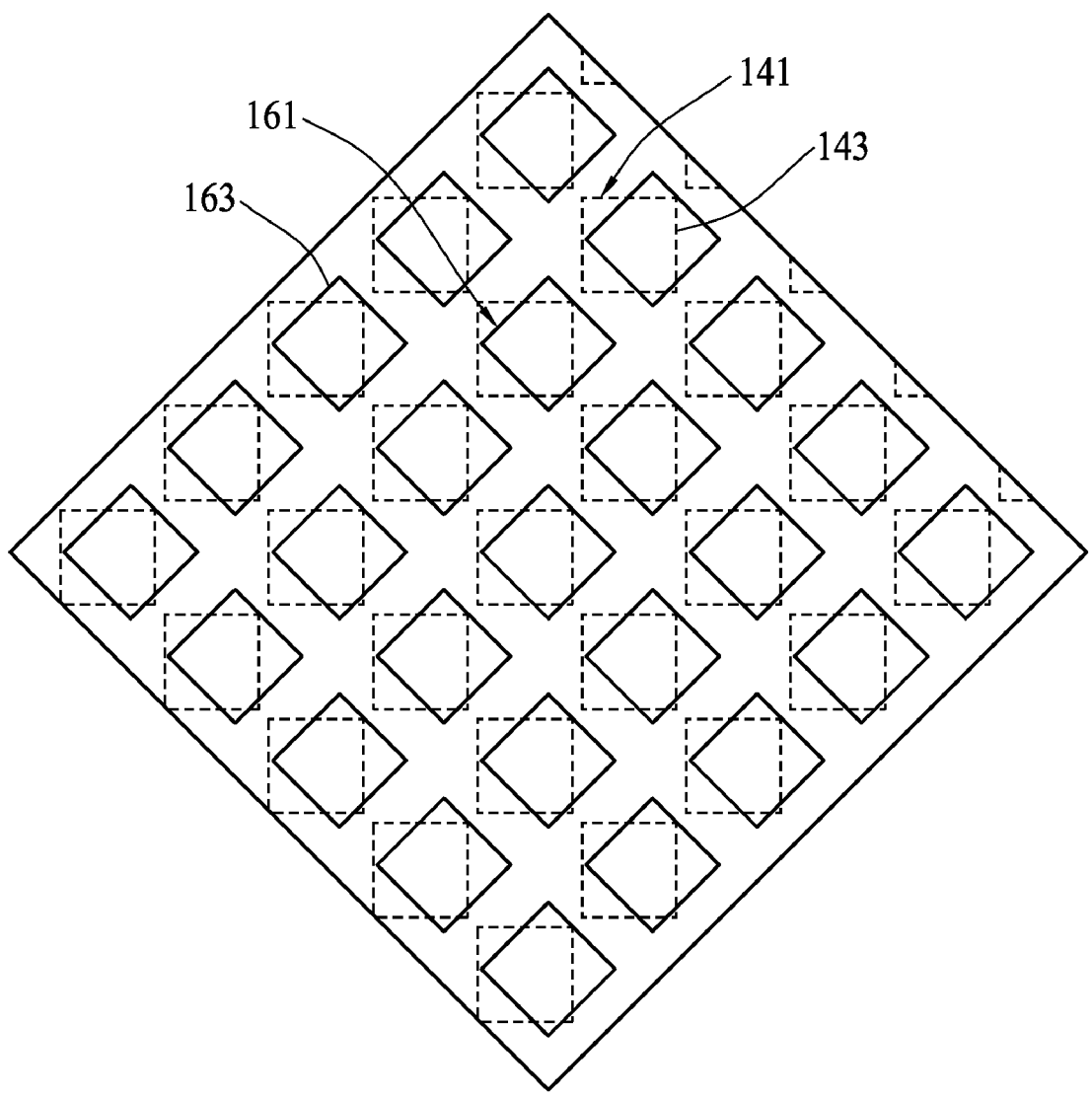
FIG. 5 shows the arrangement of a first hollowed-out pattern and a second hollowed-out pattern according to another embodiment of the present invention.

FIG. 5 shows the arrangement of a first hollowed-out pattern and a second hollowed-out pattern according to another embodiment of the present invention. In the present embodiment, the first hollowed-out pattern 141 comprises a plurality of regularly arrayed through holes 143 and the second hollowed-out pattern 161 also comprises a plurality of regularly arrayed through holes 163, wherein there is an angular difference between the through hole 143 and the through hole 163. In addition, the through holes 143 and the through holes 163 are obliquely displaced. Similarly, such an oblique displacement may make the edges of the through holes (143 and 163) crossly overlap so that the edges of the through holes (143 and 163) do not clearly appear on the display images.

Further, in other embodiments, the through hole 143 and the through hole 163 may have different shapes such that the edges defining the through holes 143 do not align with the edges defining the through holes 163. As a result, the images of the edges of the through holes 143 and 163 can be blurred and do not clearly appear on display images.

Figure 6:
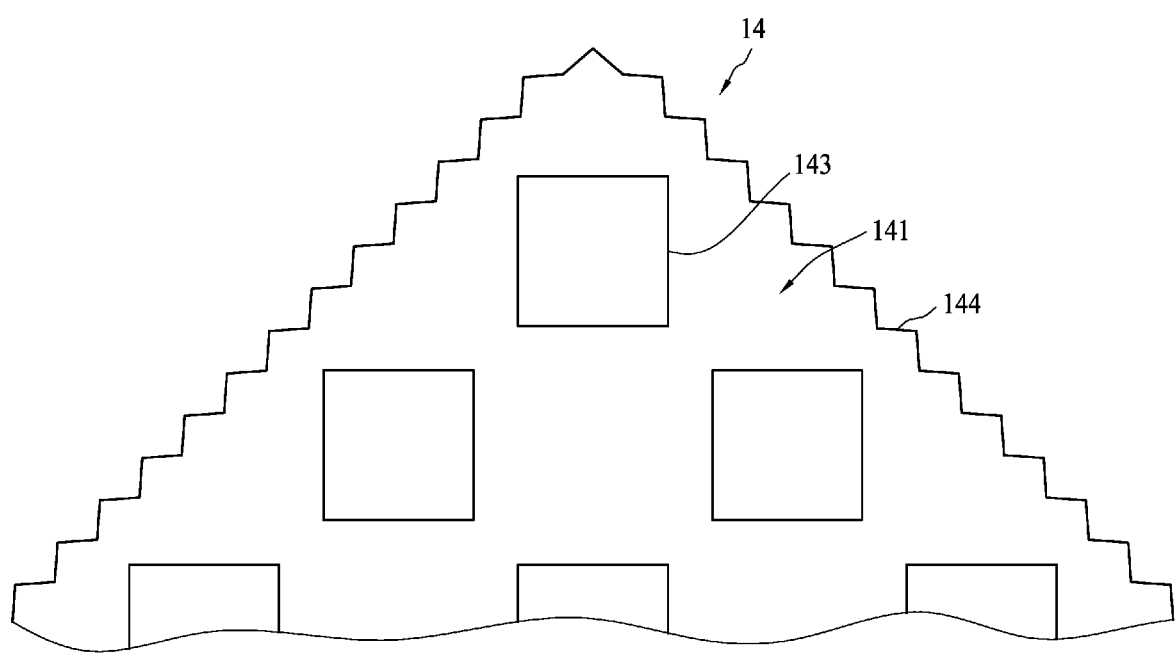
FIG. 6 shows a first touch sensor pad having non-straight edges according to one embodiment of the present invention.

FIG. 6 shows a first touch sensor pad 14 having non-straight edges according to one embodiment of the present invention. Referring to FIGS. 2 and 6, a first touch sensor pad 14 having a hollowed-out pattern 141 can increase light transmissibility; however, the aligned edges of two overlapped hollowed-out patterns 141 may distinctly appear on display images and negatively affect the display contents in the display images. Rotating one of the overlapped hollowed-out patterns 141 or obliquely shifting one of the overlapped hollowed-out patterns 141 to cause their edges to misalign may prevent the appearance of edge images on display images.

Moreover, the first touch sensor pads 14, the second touch sensor pads 16, the third touch sensor pads 20, and the fourth touch sensor pads 22 have straight edges, which may regularly reflect light, generating edge images on display images. Changing straight edges that reflect or refract light at certain angles into irregular edges can prevent reflecting or refracting light at certain angles so that the edges of the touch sensor pads 14, 16, 20, and 22 will not appear on display images. In the present embodiment, the edge 144 of the first touch sensor pad 14 is serrated, diffusing light incident thereon in different directions such that the contour images of the edges 144 of the first touch sensor pad 14 will not appear on display images. Although the present embodiment utilizes the first touch sensor pad 14 as an example, the second, third, and fourth touch sensor pads (16, 20, and 22) can also have irregular edges to prevent reduced quality of display images.

Figure 7:
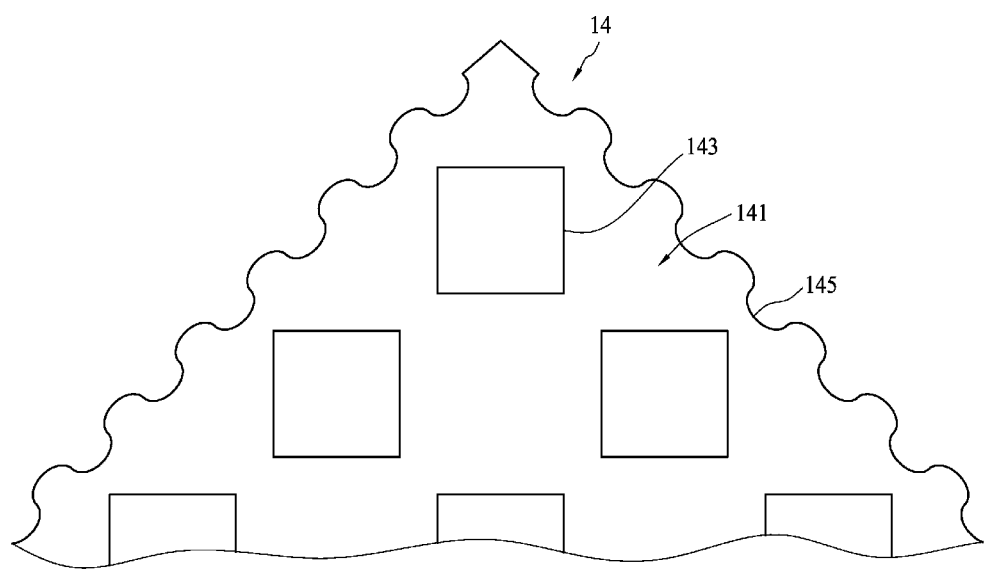
FIG. 7 shows a first touch sensor pad having non-straight edges according to another embodiment of the present invention.

FIG. 7 shows a first touch sensor pad 14 having non-straight edges according to another embodiment of the present invention. Compared to the embodiment illustrating the first touch sensor pad 14 having serrated edges as shown in FIG. 6, the present embodiment shows a first touch sensor pad 14 having sine wave-like edges 145, which can also diffuse light incident thereon in different directions such that the contour images of the edges 145 of the first touch sensor pad 14 will not appear on display images. Although the present embodiment utilizes the first touch sensor pad 14 as an example, the second, third, and fourth touch sensor pads (16, 20, and 22) can also have sine wave-like edges to prevent reduced quality of display images.

Figure 8:
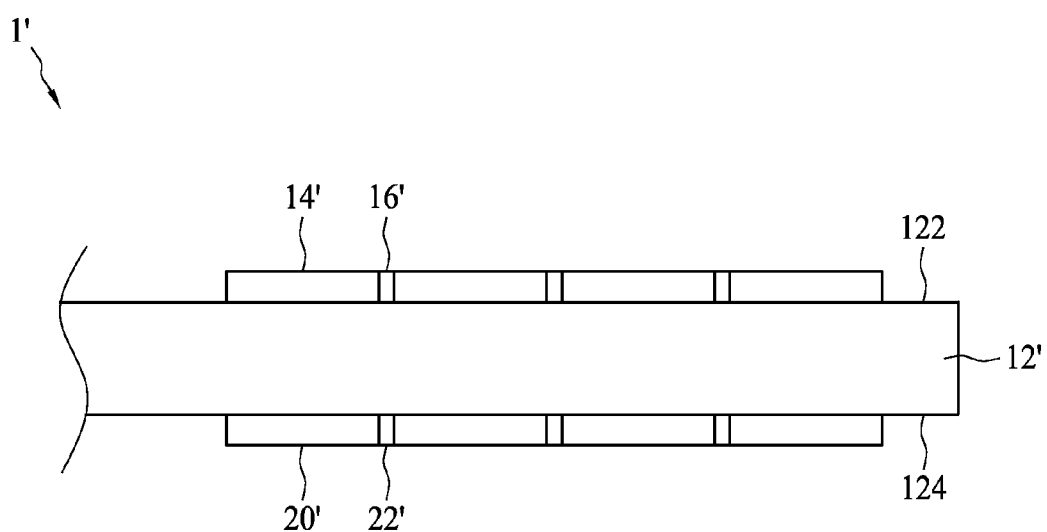
FIG. 8 shows a touch panel according to another embodiment of the present invention.

FIG. 8 shows a touch panel 1' according to another embodiment of the present invention, wherein the touch panel 1' comprises a transparent substrate 12', a plurality of first touch sensor pads 14', a plurality of second touch sensor pads 16', a plurality of third touch sensor pads 20', and a plurality of fourth touch sensor pads 22'. The transparent substrate 12 includes a first surface 122 and a second surface 124, wherein the first surface 122 and the second surface 124 are parallel to a plane defined by a first direction and a second direction. The plurality of first touch sensor pads 14' are closely arranged in a matrix on the first surface 122 of the transparent substrate 12'. In each row along the first direction, the first touch sensor pads 14' are serially connected, wherein each first touch sensor pad 14' includes an above-mentioned first hollowed-out pattern. The plurality of the second touch sensor pads 16' are also arranged in a matrix on the first surface 122 of the transparent substrate 12' and are staggered between the plurality of the first touch sensor pads 14'. A plurality of third touch sensor pads 20' are arranged in a matrix on the second surface 124, wherein each third touch sensor pad 20' may include the above-mentioned second hollowed-out pattern 161, which is defined by an above-mentioned second solid portion 162, and a portion of the first hollowed-out pattern 141 on each first touch sensor pad 14' can overlap a portion of the second solid portion 162 on each third touch sensor pad 20'. A plurality of fourth touch sensor pads 22' are arranged in a matrix on the second surface 124 and are staggered between the plurality of third touch sensor pads 20', and all of the fourth touch sensor pads 22' along the second direction are serially connected. The material of the transparent substrate 12' can be glass, polycarbonate, polymethyl methacrylate, or other materials that are considered suitable for the application of the touch panel 1 by persons skilled in the art.

Summarily, the present invention proposes different hollowed-out patterns separately formed on stacked touch sensor pads such that the edges of the hollowed-out patterns are not overlapped, preventing reduction in display image quality. The present invention further discloses touch sensor pads having serrated or wave-like edges, which can unevenly diffuse passing light so that the edges do not appear on display images.

Clearly, following the description of the above embodiments, the present invention may have many modifications and variations. Therefore, the scope of the present invention shall be considered with the scopes of the dependent claims. In addition to the above detailed description, the present invention can be broadly embodied in other embodiments. The above-described embodiments of the present invention are intended to be illustrative only, and should not become a limitation of the scope of the present invention. Numerous alternative embodiments may be devised by persons skilled in the art without departing from the scope of the following claims.

What is claimed is:

1. A touch panel, comprising:
a transparent substrate having a surface, wherein the surface is parallel to a plane formed by a first direction and a second direction;
a plurality of first touch sensor pads arranged in a matrix on the surface of the transparent substrate, wherein the first touch sensor pads along the first direction are connected in series, and each first touch sensor pad includes a first hollowed-out pattern and the first hollowed-out pattern comprises a plurality of regularly arrayed through holes;
a plurality of second touch sensor pads arranged in a matrix on the surface and staggered between the plurality of first touch sensor pads;
a dielectric layer disposed on the plurality of first and second touch sensor pads;
a plurality of third touch sensor pads arranged in a matrix on the dielectric layer, wherein each third touch sensor pad includes a second hollowed-out pattern and a solid portion defining the second hollowed-out pattern and the second hollowed-out pattern comprises a plurality of through holes, and a portion of the solid portion of each third touch sensor pad overlaps a portion of the first hollowed-out pattern of the respective first touch sensor, each through hole in the third touch sensor pad overlaps a portion of a regularly arrayed through hole in the first hollowed-out pattern; and
a plurality of fourth touch sensor pads arranged in a matrix on the dielectric layer and staggered between the plurality of third touch sensor pads, wherein the fourth touch sensor pads along the second direction are connected in series.

2. The touch panel of claim 1, wherein the second hollowed-out pattern is formed on each of the second touch sensor pads and the first hollowed-out pattern is formed on each of the fourth touch sensor pads.

3. The touch panel of claim 2, wherein each regularly arrayed through hole in the first hollowed-out pattern has a geometric profile, and the second hollowed-out pattern is formed by rotating each of the regularly arrayed through holes by an angle.

4. The touch panel of claim 3, wherein the geometric profile includes a polygonal shape, a circular shape, and an elliptical shape.

5. The touch panel of claim 3, wherein the geometric profile is a convex quadrilateral, and the angle is 45 degrees.

6. The touch panel of claim 2, wherein the through holes of the first hollowed-out pattern are misaligned with the through holes of the second hollowed-out pattern.

7. The touch panel of claim 6, wherein the geometric profile of the through hole includes a polygonal shape, a circular shape, and an elliptical shape.

8. The touch panel of claim 2, wherein the first hollowed-out pattern comprises a plurality of first through holes and the second hollowed-out pattern comprises a plurality of second through holes, wherein the first through hole has a geometric profile different from the geometric profile of the second through hole.

9. The touch panel of claim 8, wherein the geometric profile of the first and second through holes includes a polygonal shape, a circular shape, and an elliptical shape.

10. The touch panel of claim 1, wherein edges of the first, second, third, and fourth touch sensor pads are serrated or wave-like.

11. A touch panel, comprising:
a transparent substrate having a first surface and a second surface, wherein the first surface and the second surface are parallel to a plane formed by a first direction and a second direction;
a plurality of first touch sensor pads arranged in a matrix on the first surface of the transparent substrate, wherein the first touch sensor pads along the first direction are connected in series, and each first touch sensor pad includes a first hollowed-out pattern and the first hollowed-out pattern comprises a plurality of regularly arrayed through holes;
a plurality of second touch sensor pads arranged in a matrix on the first surface and staggered between the plurality of the first touch sensor pads;
a plurality of third touch sensor pads arranged in a matrix on the second surface, wherein each third touch sensor pad includes a second hollowed-out pattern and a solid portion defining the second hollowed-out pattern and the second hollowed-out pattern comprises a plurality of through holes, and a portion of the solid portion of each third touch sensor pad overlaps a portion of the first hollowed-out pattern of the respective first touch sensor, each through hole in the third touch sensor pads overlaps a portion of a regularly arrayed through hole in the first hollowed-out pattern; and
a plurality of fourth touch sensor pads arranged in a matrix on the second surface and staggered between the plurality of third touch sensor pads, wherein the fourth touch sensor pads along the second direction are connected in series.

12. The touch panel of claim 11, wherein the second hollowed-out pattern is formed on each of the second touch sensor pads and the first hollowed-out pattern is formed on each of the fourth touch sensor pads.

13. The touch panel of claim 12, wherein each regularly arrayed through hole in the first hollowed-out pattern has a geometric profile, and the second hollowed-out pattern is formed by rotating each of the regularly arrayed through holes by an angle.

14. The touch panel of claim 13, wherein the geometric profile includes a polygonal shape, a circular shape, and an elliptical shape.

15. The touch panel of claim 13, wherein the geometric profile is a convex quadrilateral, and the angle is 45 degrees.

16. The touch panel of claim 12, wherein the through holes of the first hollowed-out pattern are misaligned with the through holes of the second hollowed-out pattern.

17. The touch panel of claim 16, wherein the geometric profile of the through hole includes a polygonal shape, a circular shape, and an elliptical shape.

18. The touch panel of claim 12, wherein the first hollowed-out pattern comprises a plurality of first through holes and the second hollowed-out pattern comprises a plurality of second through holes, wherein the first through hole has a geometric profile different from the geometric profile of the second through hole.

19. The touch panel of claim 18, wherein the geometric profile of the first and second through holes includes a polygonal shape, a circular shape, and an elliptical shape.

20. The touch panel of claim 11, wherein edges of the first, second, third, and fourth touch sensor pads are serrated or wave-like.

* * * * *